May 2, 1967 B. P. SILVERMAN 3,317,712

INTEGRATED LIGHT SENSING DEVICE

Filed Oct. 3, 1962 2 Sheets-Sheet 1

INVENTOR.
BERNARD P. SILVERMAN
BY John V. Regan
Attorney

INTEGRATED LIGHT SENSING DEVICE

Filed Oct. 3, 1962 2 Sheets-Sheet 2

INVENTOR.
BERNARD P. SILVERMAN
BY John V. Regan
Attorney

United States Patent Office 3,317,712

Patented May 2, 1967

3,317,712

INTEGRATED LIGHT SENSING DEVICE

Bernard P. Silverman, Moorestown, N.J., assignor to Radio Corporation of America, a corporation of Delaware Filed Oct. 3, 1962, Ser. No. 228,058

6 Claims. (Cl. 235—61.11)

This invention relates to light sensing devices and more particularly to integrated light sensing devices for reading information recorded in storage locations of a storage medium.

Some storage mediums, such as punched cards or tapes, punched tokens, and the like, have information stored therein in the form of punched perforations or holes at certain ones of the storage locations. Others have the information stored by appropriate marks at the storage locations. Such storage mediums will henceforth be referred to as cards in the specification. To read such punched cards, various types of reading apparatus are available which detect the presence of perforations at particular locations on the card by utilizing sensing pins, conductive brushes, or the like, to penetrate through the perforations and actuate an electrical detecting circuit. Such apparatus not only requires complex mechanisms to move the brushes to and from the cards but are also subject to erroneous readings due to pitting of the brushes, the accumulation of dirt thereon and the like. Also mark-sensing reading apparatus similarly requires relatively complex and expensive reading circuitry.

The utilization of photoconductive, or light responsive elements, which detect the stored information by light transmission or reflection through or from the card, obviates the abovementioned problems. However, a difficulty is presented in reading cards in which the information is densely packed because of the large number of independent photoconductive elements required and the consequent bulkiness of the equipment resulting from such an array of photoconductive devices.

Accordingly, it is an object of this invention to provide an improved reader for punched cards and the like.

It is another object of this invention to provide an improved photoconductive reader which is capable of reading cards on which information is packed densely.

It is still a further object of this invention to provide a photoconductive card reader wherein a plurality of photoconductive elements are integrated with column and row conductors in a unitary structure capable of reading cards on which information is closely packed.

In accordance with one embodiment of the invention, an integrated light sensing device includes an insulator base on which a plurality of column conductors are integrally formed or printed. A plurality of row conductors are printed transversely across the column conductors but electrically insulated therefrom. A plurality of photoconductive elements are individually formed on the sensing device at the junctions of the row and column conductors so as to electrically interconnect the said row and column conductors at these junctions.

One embodiment of an integrated light sensing device, in accordance with the invention, is fabricated by known techniques by printing on an insulator base a first group of substantially parallel electrically conductive strips. A plurality of substantially parallel insulating strips are deposited traversely across said first group of conductive strips. A second group of electrically conductive strips are superimposed on said insulating strips so as to be electrically insulated from said first group of conductive strips. A plurality of photoconductive cells are formed at the junctions of said first and second groups of conductive strips so as to overlap the insulating strips and electrically interconnect the first and second groups of conductive strips.

A card to be read is juxtaposed closely adjacent to a reader embodying the invention so that the individual photoconductive elements on the reader coincide with the storage locations in the card. The card is illuminated by a light source and the perforations in the card permit light to impinge upon and actuate corresponding photoconductive elements. The column conductors may be energized sequentially through a stepping switch and a plurality of current detecting devices, coupled individually to the row conductors, detect the increased current in a row conductor when a photoconductive element is activated in that row.

The novel features which are considered to be characteristic of this invention are set forth with particularity in the appended claims. The invention itself, however, both as to its organization and method of operation as well as to additional objects and advantages thereof, will best be understood from the following description when read in conjunction with the accompanying drawing, in which:

Figures 1, 2, 4, 5:
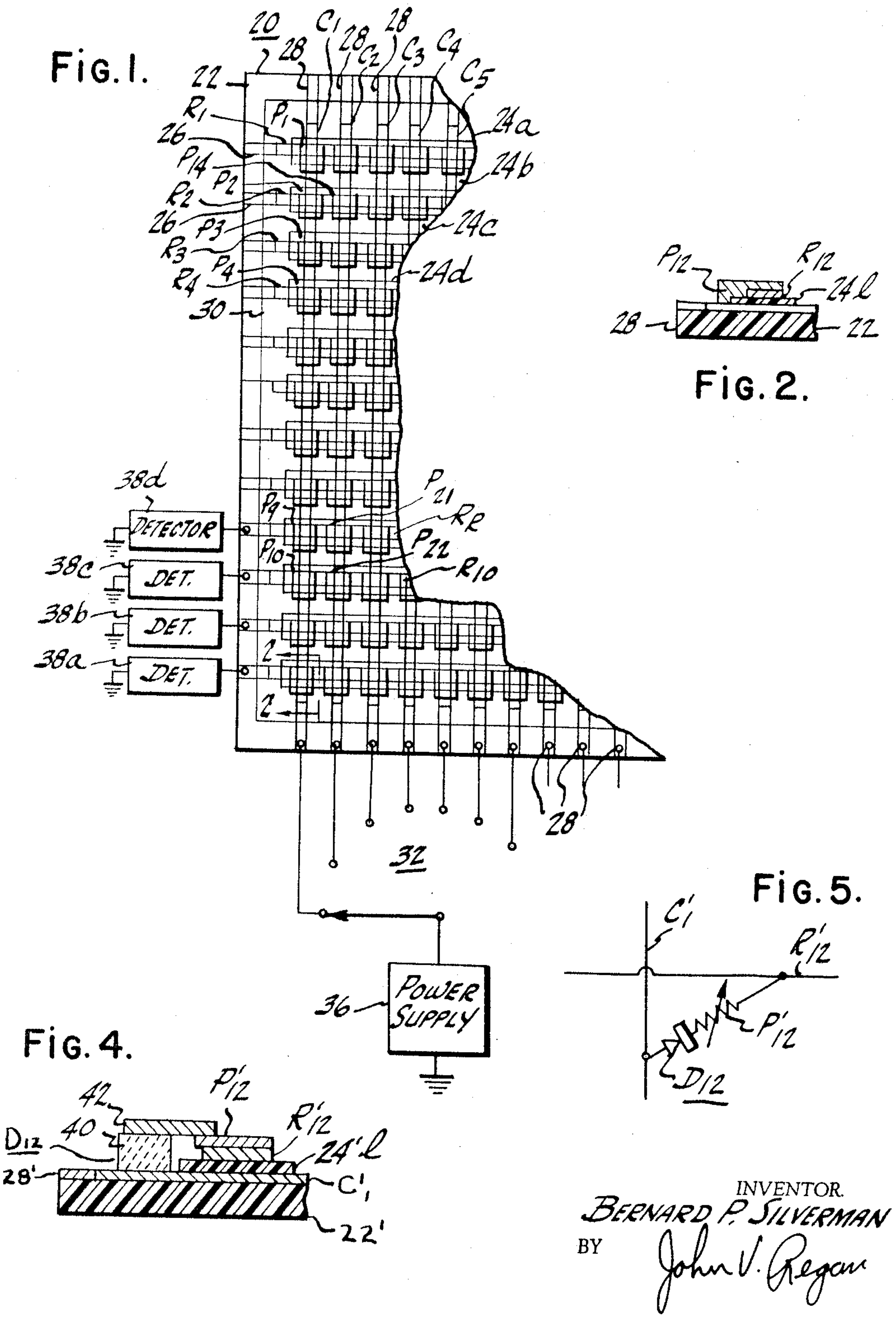
FIGURE 1 is a schematic circuit diagram of a card reading apparatus, which diagram includes a plan view of a fragment of an integrated card reader in accordance with the invention.
FIGURE 2 is an elevational view taken along section lines 2—2 of a portion of the integrated card reader of FIGURE 1.
FIGURE 4 is an elevational view, taken along section lines 4—4 of a portion of the card reader of FIGURE 3.
FIGURE 5 is an equivalent circuit diagram of the embodiment of the invention shown in FIGURE 3.

Referring now to FIGURE 1, an integrated card reader 20 in accordance with the invention includes a support or base member 22 made of an insulating material, such as Pyrex glass or ceramic. The base member 22 may be substantially rectangular in shape and of a sufficient thickness to function as a rigid supporting base for the card reader. A plurality of column conductors $C_1$ through $C_n$ are integrally formed or printed on one surface of the base member 22 so as to be spaced from and substantially parallel to each other and the side edge of the base member 22. The column conductors $C_1$–$C_n$ may be made of any suitable conductive material, such as gold, and are insulated from each other by the base member 22. A plurality of substantially parallel insulating strips $24_a$–$24_n$ are deposited transversely across the column conductors $C_1$–$C_n$ so as to be parallel to the top and bottom edges of the base member 22. The insulating strips $24_a$–$24_n$ are deposited transversely across the column conductors $R_1$ through $R_n$ are superimposed on top of the insulating strips $24_a$–$24_n$. The row conductors $R_1$–$R_n$ (which may also be made of gold) are dimensioned to be narrower in width than the insulating strips $24_a$–$24_n$ so that the row conductors $R_1$–$R_n$ are insulated from the column conductors $C_1$–$C_n$. The ends of the row conductors $R_1$–$R_n$ and the column conductors $C_1$–$C_n$ are extended to the top, bottom, and side edges of the base member 22 by means of groups of conductive strips 26 and 28 respectively. The conductive strips 26 and 28 are made of a conductor, such as silver, so that external circuit connections can be soldered or otherwise connected to the row and column conductors.

At the spatial intersections of the individual column $C_1$–$C_n$ and row $R_1$–$R_n$ conductors, individual rectangular photoconductive elements $P_1$–$P_n$ are formed. The photoconductive elements are superimposed on top of the row conductors $R_1$–$R_n$ and extend beyond the insulating strips $24_a$–$24_n$ to physically contact the column conductors $C_1$–$C_n$. The photoconductive elements $P_1$–$P_n$, which may for example be made of cadmium sulfide, electrically interconnect the row and column conductors. A suitable cover or mask 30 is superimposed on the top surface of the base member 22 to encapsulate the photoconductive card reader 20 and prevent moisture, dirt, and the like from accumulating thereon. The mask 30 may be made of any transparent insulating material, such as epoxy, and is dimensioned to expose portions of the conductive strips 26 and 28 to permit soldering external circuit connections to the row and column conductors.

The dimensions of the photoconductive reader 20 are selected to correspond to the storage medium to be read and the photoconductive elements $P_1$–$P_n$ are positioned to correspond with the possible storage locations in the storage medium. Thus, in a typical punched card including 80 columns and 12 rows, the photoconductive reader 20 would include 80 column conductors, 12 row conductors and 960 photoconductive elements.

The incorporation of such a large number of photoconductive elements in a photoconductive reader is possible because they are integrated with row and column conductors into a unitary structure rather than being separate elements interconnected by external circuit connections.

An elevational view, taken along section line 2—2 of FIGURE 1, of a segment of the photoconductive reader 20, with the cover 30 removed, is shown in FIGURE 2. This view is not to scale and is shown merely to illustrate the third dimension (height) which is absent from FIGURE 1. It is to be noted that at the intersection, column conductor $C_1$ lies in a different plane than row conductor $R_{12}$ and the insulating strip $24_1$ is interposed therebetween. The photoconductive element $P_{12}$ is formed to span the insulating strip $24_1$ and make contact with both the row $R_{12}$ and column $C_1$ conductors.

The integration of the photoconductive elements, the column and row conductors, and the insulating strips on the base member 22 may be done by any of a variety of well known techniques, such as silk screening and spray metalizing. The process, for example, comprises the steps of printing a first group of spaced conductive strips on an insulating base, transversely depositing a plurality of spaced insulating strips across said first group of conductive strips, superimposing a second group of conductive strips on said insulating strips so that said first and second groups are insulated from each other, and forming an individual photoconductive element at each junction of said first and second groups of conductive strips so as to electrically interconnect said first and second groups. Between each step, the photoconductive card reader may be heat treated, such as baked or fired, to set or solidify the material deposited on the insulator base.

As shown in FIGURE 1, the integrated photoconductive card reader 20 may be utilized to read the perforations on a punched card by sequentially energizing the column conductors $C_1$–$C_n$ and detecting current changes in the row conductors $R_1$–$R_n$. Thus the column conductors $C_1$–$C_n$ are individually connected to the terminals of a stepping switch 32, the common terminal 34 of which is connected to a power supply 36. The row conductors $R_1$–$R_n$ are individually connected to current detectors $38_a$–$38_n$. For simplicity, not all of the current detectors 38 and stepping switch 32 terminals are shown.

In operation, a punched card to be read (not shown) is interposed in a stationary position between a light source (not shown) and the photoconductive card reader 20. The punched card is juxtaposed closely adjacent to the card reader 20. The entire surface of the card will be illuminated and light will penetrate the perforations therein to actuate corresponding photoconductive elements $P_1$–$P_n$. The photoconductive elements $P_1$–$P_n$ have the electrical property of exhibiting a low resistance when illuminated and a high resistance when not illuminated. Thus, for example, a perforation existing in the first column and tenth row of a card being read will activate the photoconductive element $P_{10}$. The stepping switch 32, is actuated by a timed driving device (indicated by the arrow thereon), energizes the column conductors $C_1$–$C_n$ consecutively. When the stepping switch 32 is at the column conductor $C_1$ position, the increased conductivity of the photoconductive element $P_{10}$ causes the detector $38_c$ to detect the increased current in row conductor $R_{10}$. Thus the combination of the stepping switch 32 and detector $38_c$ locates the presence of a perforation in column 1, row 10, of the punched card. The remaining columns are similarly read and at the end of the Nth column the card is removed and a new card inserted in its place.

The embodiment of the invention described is capable of reading punched cards which contain only a single perforation in a column. This is because erroneous readings may occur when a punched card contains more than one perforation in any particular row and also contains a perforation in the same column in which one of the row perforations appear. For example, assume a punched card contains a perforation in column 1, row 10, and two perforations in column 2, at rows 10 and 11. Under these conditions, the photoconductive elements $P_{10}$, $P_{21}$ and $P_{22}$ will be illuminated and activated. When the stepping switch 32 energizes column conductor $C_1$, the lowered resistance of photoconductive element $P_{10}$ will cause detector $38_c$ to sense the increased current flow in the row conductor $R_{10}$. However, since the photoconductive element $P_{22}$ is also activated, the column conductor $C_2$ will be energized from the row conductor $R_{10}$ even though the stepping switch 32 has not rotated to this column position. The decreased resistance of the photoconductive element $P_{21}$ will therefore similarly energize the row conductor $R_9$ and the detector $38_d$ will respond to such energization. Thus both the detectors $38_c$ and $38_d$ will produce responses causing an error in the reading. One method of eliminating this ambiguity is by providing a two-perforation-per-column card reader. Such a reader is obtained by breaking the column conductors between a pair of row conductors, such as between row conductors $R_3$ and $R_4$, and connecting the upper ends of the column conductors $C_1$–$C_n$ to the appropriate terminals of the stepping switch 32. Such an embodiment is capable of reading two perforations in a single column if one perforation in the card is above the break in the photoconductive reader 20 and the other perforation is below the break.

However, it is to be noted that erroneous actuation of the detectors $38_a$–$38_n$ occurs in the embodiment of FIGURE 1 when a column conductor is energized from a row conductor. Thus sneak currents originate from current which flows from a row conductor to a column conductor. (If the stepping switch 32 were coupled to the row conductors $R_1$–$R_n$, the reverse would be true.) The origin of such error current flow is therefore unidirectional in character and may be prevented by inserting an individual unilateral conducting device that is substantially light insensitive, such as a diode, in series with each photoconductive element $P_1$–$P_n$ and poling the diodes to prevent current conduction from row conductors $R_1$–$R_n$ to column conductors $C_1$–$C_n$.

Figures 3, 6, 7:
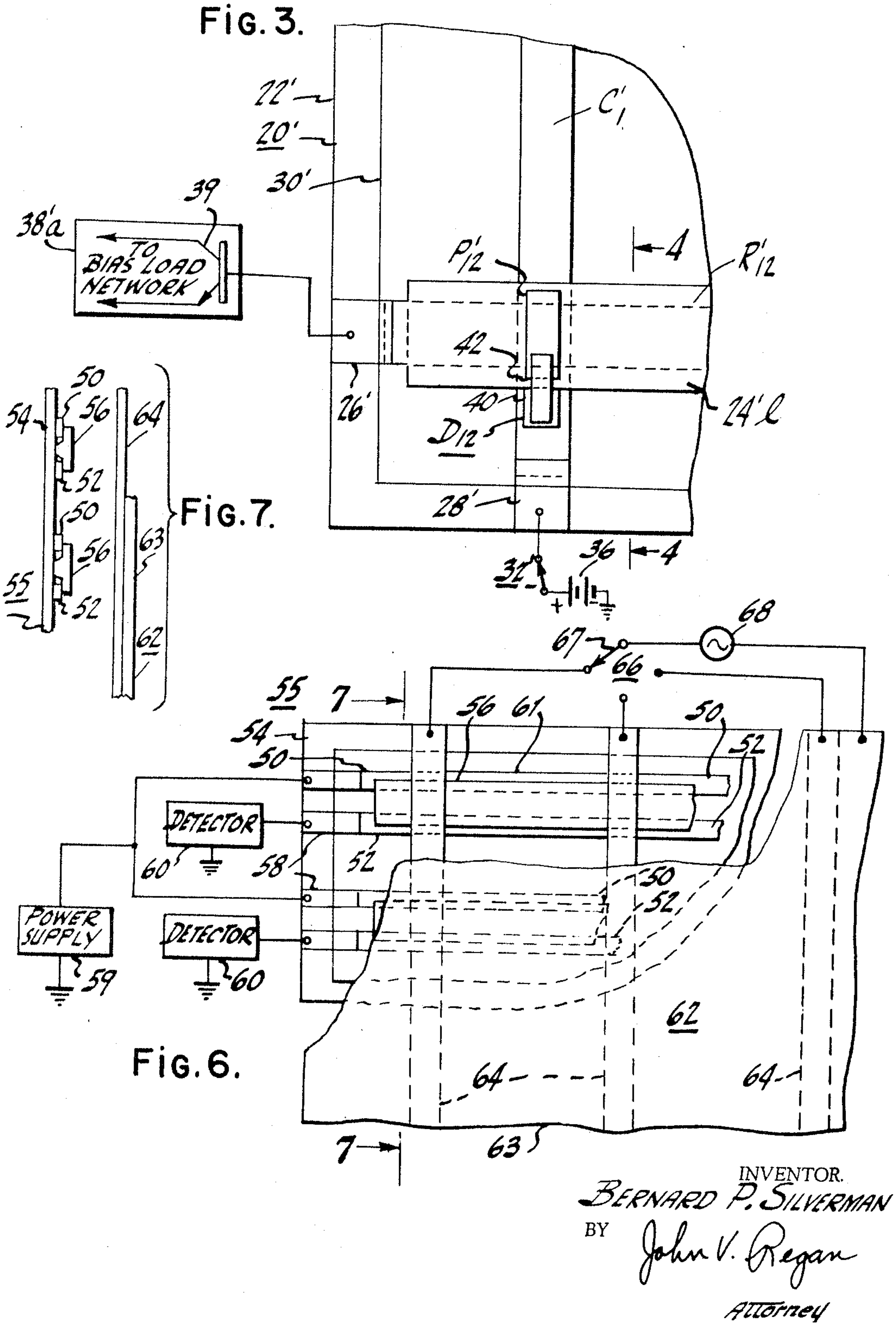
FIGURE 3 is a schematic circuit diagram including a plan view of a fragment of another card reader embodying the invention.
FIGURE 6 is a fragmentary plan view of another card reader embodying the invention.
FIGURE 7 is an elevational view, taken along section lines 7—7, of a portion of the photoconductive card reader of FIGURE 6.

An integrated photoconductive reader embodying this form of the invention is shown in fragmentary form in FIGURE 3. Similar reference numerals have been given to parts identical to those in FIGURE 1. The column and row conductors $C_1'$ and $R_{12}'$ and the insulating strip $24_1'$ are printed or formed similarly to those in FIGURE 1. However the photoconductive element $P_{12}'$ is formed at the junction of the column and row conductors so as not to overlap the insulating strip $24_1'$. Consequently the photoconductive element $P_{12}'$ only physically contacts the row conductor $R_{12}'$. To provide a unidirectional conduction path, between the column conductor $C_1'$ and row conductor $R_{12}'$, which includes the photoconductive element $P_{12}'$, a diode $D_{12}$ is also formed at this junction. One electrode 40 of the diode $D_{12}$ is formed on the column conductor $C_1'$ and the other electrode 42 of the diode $D_{12}$ is formed between the electrode 40 and the photoconductive element $P_{12}'$. The diode $D_{12}$ may, for example, comprise a selenium rectifier wherein the electrode 40 is selenium and therefore functions as the anode of the diode $D_{12}$. The other electrode 42 will therefore be a metal and functions as the cathode of the diode $D_{12}$.

FIGURE 4 illustrates how such a configuration would appear. The interstices between the various components would be filled with an insulating material to prevent undesired conduction paths.

The equivalent circuit diagram of the series combination of the diode $D_{12}$ and the photoconductive element $P_{12}'$ is shown in FIGURE 5. With the poling of the diode $D_{12}$ as shown, no erroneous readings can result from the embodiment of the invention shown in FIGURE 3 because substantially no current will flow from the row conductors to the column conductors in the card reader. Consequently cards to be read may be packed densely with information without erroneous readings occurring. With the poling of the diodes $D_{12}$ as shown and described, the positive terminal of the power supply 36' (shown in FIGURE 3 as a battery) would be connected to the column conductors through the stepping switch 32', while the negative terminal would be grounded. Also the current detector $38_a'$ may comprise an NPN transistor 39 with the base thereof connected to the row conductors.

It is also to be noted that a plurality of separate diodes could be mounted in an array and spaced apart from the photoconductive card reader. Interconnections, as by ordinary wire leads, between the diodes, photoconductive elements, and row and column conductors may be made, if sufficient space is available in the photoconductive reader, by drilling holes therethrough and running the wire conductors through the holes.

Another embodiment of the invention, which eliminates the necessity of utilizing diodes to prevent sneak currents, is shown in FIGURE 6. In this embodiment, a first group of conductive strips 50 and a second group of conductive strips 52 are printed lengthwise on an insulating base member 54 of a photoconductive device 55. The conductive strips 50 and 52, which may be made of gold, are printed in pairs on the base member 54, which may be made of Pyrex glass, so as to be parallel to the top and bottom of the base member 54. A plurality of pairs of conductive strips are formed, with each pair including one conductor from each of the groups 50 and 52. Each conductor in a pair is insulated from the other, as well as from the conductors in other pairs, by the base member 54.

A plurality of photoconductive strips 56 are printed on top of each pair of conductive strips so as to connect the conductor 50 to the conductor 52 in each pair. The photoconductive strips 56, which may be made of cadmium sulfide, extend lengthwise and continuously along the base member 54 rather than being a series of discrete elements as in previous embodiments.

The ends of the conductive strips 50 and 52 are silver tipped with the strips 58 to permit soldering thereto. The end of each conductive strip 50 is connected to a D.C. power supply 59 while the end of each conductive strip 52 is connected to a separate current detector 60. An insulating mask or cover 61, which may be made of epoxy, is provided to encapsulate the photoconductive device 55.

An electroluminescent device 62, which includes a conductive base member 63 on which are printed a plurality of light strips 64, is provided to function as the light source for the photoconductive device 55. Each light strip 64 may therefore comprise a strip of electroluminescent material, such as zinc sulfide on top of which is deposited a strip of transparent conductive material such as tin oxide. The transparent conductor of each light strip 64 is connected to one terminal of a stepping switch 66 which switch is coupled to be driven by a driving device, as shown by the arrow thereon. The common terminal 67 of the stepping switch 66 is connected to one terminal of an alternating current source 68 while the other terminal of the source 68 is connected to the base member 63 of the electroluminescent device 62. The electroluminescent light strips 64 exhibit the property of emitting light when electrically energized by the source 68.

This embodiment of the invention therefore includes two separate parts, namely the photoconductive member 55 and the electroluminescent member 62, which, as shown in FIGURE 7, are spaced slightly apart from each other. In FIGURE 7, the cover 61 has been removed for clarity. Each member 55 and 62 is rigidly mounted in a suitable support (not shown) so that no ambient light is present.

The light strips 64 in this embodiment correspond to the columns in a card to be read and the pairs of conductors 50 and 52 correspond to the rows in the card. To read a typical card, the photoconductive member 55 would therefore include twelve pairs of conductors 50 and 52 as well as twelve photoconductive strips 56 while the electroluminescent member 62 would include eighty light strips 64.

The photoconductive member 55 and the electroluminescent member 62 may be fabricated by any well known technique, such as silk screening and spray metalizing.

A punched card to be read is interposed between the photoconductive member 55 and the electroluminescent member 62 and the stepping switch 66 is driven through its various positions. As each light strip 64 is in turn energized by the A.C. source 68, light is emitted by the strip and penetrates through perforations in the corresponding column in the punched card. The light emitted through a perforation in a column in the card illuminates a portion of a particular photoconductive strip 56 corresponding to the row in which the perforation appears in the card. A current detector 60 detects the increased current flow from the D.C. power supply 59 through the particular pair of conductive strips 50 and 52 which are interconnected by an activated portion of a photoconductive strip 56. Thus the light strips 64 locates the presence of a perforation in a column in the punched card while the photoconductive strips 56 detect the row in which the perforation appears.

It is to be noted that there are no sneak current paths in the embodiment of the invention shown in FIGURE 6, so no erroneous readings can occur. Each pair of conductive strips 50 and 52 are insulated from every other pair and the punched card is positioned close enough to the electroluminescent member 62 so that light emitted by any one light strip 64 does not penetrate through perforations in an adjoining column in the punched card. Thus there is no arbitrary limitation on the number of perforations that may appear in any column in a punched card to be read.

Thus, in accordance with the invention, a light sensing device is provided which is capable of reading cards containing a large amount of stored data. The light sensing device has a long life as compared to electromechanical readers, requires less maintenance, and is less subject to reading errors due to adverse environmental operating conditions. The card reader is also compact and simple in construction.

What is claimed is:

1. A sensing device comprising in combination a plurality of column conductors, a plurality of row conductors positioned transversely across and insulated from said column conductors, and photoconductive means and unidirectional conduction means serially coupled between said column and row conductors to provide unidirectional electrical connections therebetween when illuminated.

2. A sensing device comprising in combination first and second groups of conductors positioned transversely to and insulated from each other, photoconductive means and unidirectional conduction means serially coupled between said first and second groups of conductors to provide unidirectional connections therebetween when illuminated, energizing means coupled to drive said conductors in said first group successively, and detector means coupled to said second group of conductors.

3. A light sensor comprising in combination, a first group of conductors, a second group of conductors transverse to said first group of conductors to form a plurality of junctions therewith, insulating means positioned intermediate said first and second groups of conductors to insulate said first group of conductors from said second group of conductors, and photoconductive means and unidirectional conduction means serially coupled between said first and second group of conductors to provide unidirectional electrical connections between said first and second groups of conductors at said junctions when illuminated.

4. A photoconductive card reader comprising in combination an insulating base member, a plurality of column conductors integrally formed on said base member, a plurality of substantially parallel insulating strips deposited transversely across said column conductors, a plurality of row conductors superimposed on said insulating strips so as to be electrically insulated from said column conductors, and photoconductive means and unidirectional conduction means serially coupled between said column and row conductors to provide a unidirectional conduction path from said column conductors to said row conductors when said photoconductive means are illuminated.

5. An integrated photoconductive card reader comprising in combination an insulating base member, a first group of spaced conductors printed on said base member, a plurality of insulating strips deposited transversely across said first group of conductors, a second group integrally superimposed on said insulating strips, photoconducting means and unidirectional conduction means serially coupled between said first and second groups of conductors so as to provide a unidirectional conduction path between said first and second groups of conductors at their junctions when said photoconductive means are illuminated.

6. A sensing device comprising in combination an insulating base member, first and second alternate groups of printed conductors mounted spaced from but substantially parallel to each other on said base member so as to be insulated from each other, a group of photoconductive strips mounted on said base member to electrically connect together pairs of first and second groups of conductors, a conductive member substantially coextensive with said base member, a plurality of electroluminescent strips mounted on said conductive member, and means juxtaposing said conductive member substantially coextensive with said base member adjacent said insulating base member with said electroluminescent strips transverse to said first and second groups of conductors.

References Cited by the Examiner

UNITED STATES PATENTS

| | | | |
|---|---|---|---|
| 3,046,540 | 7/1962 | Litz et al. | 340—347 |
| 3,165,634 | 1/1965 | Raymond | 250—219 |
| 3,191,040 | 6/1965 | Critchlow | 250—209 |
| 3,201,764 | 8/1965 | Parker | 340—173 |

DARYL W. COOK, *Acting Primary Examiner.*

MAYNARD WILBUR, A. L. NEWMAN, *Assistant Examiners.*